Patented Apr. 28, 1953

2,636,884

UNITED STATES PATENT OFFICE 2,636,884

1,3-DIOXOLANE DERIVATIVES AND METHOD OF PREPARING THE SAME

Leon E. Tenenbaum, Brooklyn, and John V. Scudi, New York, N. Y., assignors to Nepera Chemical Co., Inc., Nepera Park, Yonkers, N. Y., a corporation of New York No Drawing. Application June 12, 1951, Serial No. 231,253

8 Claims. (Cl. 260—340.9)

1

This invention relates to new 1,3-dioxolane compounds, and particularly relates to 4-(o-methylphenoxymethyl), 1,3-dioxolanes substituted in the 2- position and a method of preparing them.

More specifically, it relates to such compounds in which one of the hydrogens in the 2- position may be substituted by a lower alkyl group and the other hydrogen is substituted by a lower alkoxy group. By the term lower alkyl and lower alkoxy groups we mean radicals with one to five carbon atoms.

The compounds of this series of dioxolane derivatives are valuable for therapeutic purposes. They are biologically active substances, which exert a depressant action on the central nervous system. They can be administered safely as they possess a relatively low degree of toxicity.

The probable general formula of these compounds is:

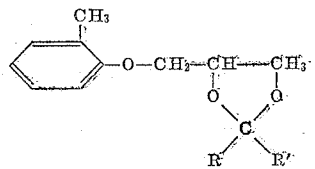

in which R represents hydrogen or a lower alkyl group, and R' represents a lower alkoxy group.

Our new compounds are prepared, according to the method of our invention, by heating 1-(o-methylphenoxy)-2,3-dihydroxypropane with an excess of a lower alkyl orthoester of a lower alkyl carboxylic acid according to the equation:

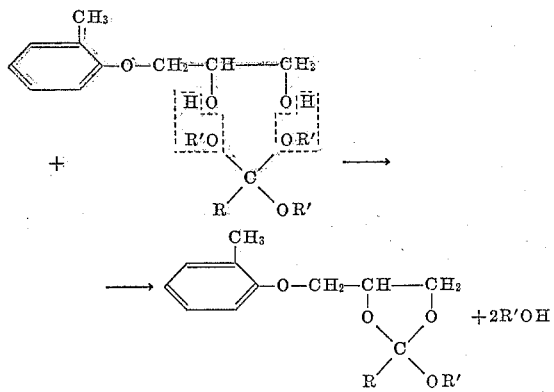

We distill off the alcohol formed and at least half of the excess orthoester and then fractionate the residue in vacuum. We may add a catalytic quantity (i. e. from about 1% to about 5% by weight of the dihydroxypropane derivative) of sulfuric acid or other esterification catalyst to the reaction, but in most cases we have found it to be unnecessary.

The following are several illustrative examples of some of the preferred procedures of carrying out our invention, and of the products obtained thereby, which are given for illustration and not for limitation.

Example 1

73 grams of 1-(o-methylphenoxy)-2,3-dihydroxypropane and 200 grams of methyl ortho n-valerate were heated in a distilling flask with 1 ml. of concentrated sulfuric acid until the temperature of the distillate reached 80° C. at which point no more methanol came over. The heat input was then raised so that the temperature of the distillate reached 165° C. and kept there until about one-half of the excess methyl ortho n-valerate came over. The residue was then distilled under reduced pressure. The product, 2-butyl - 2 - methoxy - 4 - (o - methylphenoxymethyl)-1,3-dioxolane was collected at 166° C. at 5 mm.

Analysis of the product showed: C=69.0%, H=8.41%
(Calculated for $C_{16}H_{24}O_4$    68.6        8.63)

Example 2

37 grams of 1-(o-methylphenoxy)-2,3-dihydroxypropane and 106 grams of ethyl orthopropionate was gently heated in a distilling flask with 1 ml. of concentrated sulfuric acid until the temperature of the distillate reached 90° C. at which point no more ethanol came over. The heat input was then raised so that the temperature of the distillate reached 163° C. and kept there until about one-half of the excess ethyl orthopropionate came over. The residue was then distilled under reduced pressure. The product, 2 - ethyl - 2 - ethoxy - 4 - (o - methylphenoxymethyl)-1,3-dioxolane, was collected at 194–195.5° C. at 27 mm.

Analysis of the product showed: C=68.0%, H=8.67%
(Calculated for $C_{15}H_{22}O_4$    67.6        8.33)

Example 3

37 grams of 1-(o-methylphenoxy)-2,3-dihydroxypropane and 97 grams of ethyl orthoacetate were heated in a distilling flask until the temperature of the distillate reached 90° C. at which point no more ethanol came over. The heat input was then raised so that the temperature of the distillate reached 145° C. and kept there until about one-half of the excess ethyl orthoacetate came over. The residue was then distilled under reduced pressure. The product, 2-methyl-2-ethoxy - 4 - (o-methylphenoxymethyl) - 1,3 - dioxolane, was collected at 171–172° C. at 14 mm.

Analysis of the product showed: C=66.6%, H=8.00%
(Calculated for $C_{14}H_{20}O_4$  66.6  7.99)

*Example 4*

73 grams of 1-(o-methylphenoxy)-2,3-dihydroxypropane and 200 grams of methyl orthoacetate were heated in a distilling flask until the temperature of the distillate reached 80° C. at which point no more methanol came over. The heat input was then raised so that the temperature of the distillate reached 110° C. and kept there until about one-half of the excess methyl orthoacetate came over. The residue was distilled under reduced pressure. The product, 2-methyl-2-methoxy-4-(o-methylphenoxymethyl)-1,3-dioxolane, was collected at 144° C. at 8 mm.

Analysis of the product showed: C=65.9%, H=7.52%
(Calculated for $C_{13}H_{18}O_4$  65.5  7.61)

*Example 5*

37 grams of 1-(o-methylphenoxy)-2,3-dihydroxypropane and 148 grams ethyl orthoformate were heated in a distilling flask with 1 ml. of concentrated sulfuric acid until the temperature of the distillate reached 92° C. at which point no more ethanol came over. The heat input was then raised so that the temperature of the distillate reached 150° C. and kept there until about one-half of the excess ethyl orthoformate came over. The residue was then distilled under reduced pressure. The product, 2-ethoxy-4-(o-methylphenoxymethyl)-1,3-dioxolane, was collected at 175–176° C. at 15 mm.

Analysis of the product showed: C=65.4%, H=7.58%
(Calculated for $C_{13}H_{18}O_4$  65.5  7.61)

In each example, the analytical results checked the calculated, or "theoretical," within normally accepted limits.

The 2-substituted,2 - alkoxy,4 - (o-methylphenoxymethyl),2,3-dioxolanes of our invention are colorless liquids at room temperature. They are insoluble in water and aqueous alkali solutions. They decompose in dilute acids. They are soluble in the common organic solvents such as alcohol, ether, acetone, benzene, ligroin and pyridine. They are also soluble in animal and vegetable oils.

Pharmacological studies show that our new compounds exert a depressant action on the central nervous system and are relatively low in toxicity. They may be effectively administered either orally or parenterally. We have administered them orally either in a liquid emulsion or a powder form. For the former, we have dissolved 2 g. of the substituted dioxolane in 40 ml. of propylene glycol and then added water to a total volume of 100 ml. For administration in powder form we have mixed 2 g. of the substance with starch paste and, after drying, diluted the mixture with milk sugar to a total weight of 100 grams. For parenteral injection, 2 g. of the compound was dissolved in almond, cottonseed, or olive oil. Other inert or otherwise physiologically acceptable solids or liquids may also be used as menstrua.

Having so described our invention, we do not limit ourselves to the specifically mentioned times, temperatures, quantity of chemicals or steps of procedure as these are given simply to clearly describe our invention as set forth in our specification and claims, and they may be varied without going beyond the scope of our invention.

We claim:

1. The process for producing 2-alkyl,2-alkoxy, 4 - (o-methylphenoxymethyl) - 1,3 - dioxolanes, comprising the steps of reacting 1-(o-methylphenoxy)-2,3-dihydroxypropane with an orthoester, distilling off the by-product alcohol formed and the unreacted excess of the orthoester and collecting the product so formed by distillation under reduced pressure.

2. The process for producing 2-alkyl,2-alkoxy, 4 - (o-methylphenoxymethyl) - 1,3 - dioxolanes, comprising the steps of reacting 1-(o-methylphenoxy)-2,3-dihydroxypropane with an orthoester in the presence of catalytic amounts of an esterification catalyst, distilling off the by-product alcohol formed and the unreacted excess of the orthoester and collecting the product so formed by distillation under reduced pressure.

3. 2-alkyl,2 - alkoxy,4-(o-methylphenoxymethyl)-1,3-dioxolanes of the general formula:

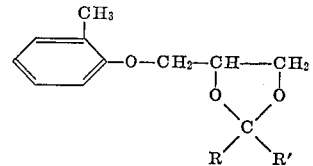

in which R is selected from the members of a group consisting of hydrogen and lower alkyl radicals with one to five carbon atoms and R' represents a lower alkoxy radical having one to five carbon atoms.

4. 2 - butyl,2 - methoxy,4 - (o-methylphenoxymethyl),1,3-dioxolane.

5. 2-ethyl,2 - ethoxy,4-(o-methylphenoxymethyl),1,3-dioxolane.

6. 2 - methyl,2 - ethoxy,4 - (o-methylphenoxymethyl),1,3-dioxolane.

7. 2-methyl,2 - methoxy,4-(o-methylphenoxymethyl),1,3-dioxolane.

8. 2-ethoxy,4-(o-methylphenoxymethyl),1,3-dioxolane.

LEON E. TENENBAUM.
JOHN V. SCUDI.

References Cited in the file of this patent

UNITED STATES PATENTS

| Number | Name | Date |
|---|---|---|
| 2,028,403 | Mares | Jan. 21, 1936 |
| 2,286,791 | Dickey | June 16, 1942 |

OTHER REFERENCES

Virtue Proceedings Society Experimental Biology and Medicine, February 1950, pp. 259 to 262.

Yoder, J. A. Chemical Society, vol. 45 (1923), pp. 475 to 479.